United States Patent [19]

Anthon

[11] Patent Number: 4,863,246

[45] Date of Patent: Sep. 5, 1989

[54] OPTICAL SYSTEM AND COMPONENTS FOR OPTICAL DISK READER

[75] Inventor: Erik W. Anthon, Santa Rosa, Calif.

[73] Assignee: Optical Coating Laboratory, Inc., Santa Rosa, Calif.

[21] Appl. No.: 268,667

[22] Filed: Nov. 4, 1988

Related U.S. Application Data

[63] Continuation of Ser. No. 896,601, Aug. 14, 1986, abandoned.

[51] Int. Cl.[4] .................... G02F 1/29; G02B 27/28
[52] U.S. Cl. ..................... 350/394; 350/173; 350/377; 350/398; 360/114; 369/110
[58] Field of Search ................ 350/170–171, 350/173, 377, 394–395, 166, 397, 398; 360/114; 369/110

[56] References Cited

U.S. PATENT DOCUMENTS

| 2,403,731 | 7/1946 | MacNeille | 350/171 |
|---|---|---|---|
| 3,622,225 | 11/1971 | Buchman et al. | 350/395 |
| 3,844,638 | 10/1974 | Lingenfelder et al. | 350/171 |
| 4,084,883 | 4/1978 | Eastman et al. | 350/394 |
| 4,561,032 | 12/1985 | Matsumoto et al. | 360/114 |
| 4,627,688 | 12/1986 | Kobayashi et al. | 350/173 |
| 4,659,185 | 4/1987 | Aughton | 350/394 |
| 4,721,368 | 1/1988 | Deguchi et al. | 350/377 |

FOREIGN PATENT DOCUMENTS 72065  6/1979  Japan .................... 350/171

OTHER PUBLICATIONS

Dobrowolski, A. "Conpletely Automatic Synthesis of Optical Thin Film Systems", App. Optics 8-1965, pp. 937-946.

Primary Examiner—Bruce Y. Arnold
Assistant Examiner—Martin Lerner
Attorney, Agent, or Firm—Philip A. Dalton

[57] ABSTRACT

A flat plate polarization separator assembly and a flat plate beam splitter and partial polarizer are disclosed, along with an optical system for an optical disk reader which utilizes these flat plate components.

10 Claims, 3 Drawing Sheets

$R_s = R_p$
$A/B = 1.30$ $R_s = 4R_p$
$A/B = 3.1$
FARADAY ROTATION = $\alpha$

OPTICAL SYSTEM AND COMPONENTS FOR OPTICAL DISK READER

This is a continuation, of application Ser. No. 896,601 filed Aug. 14, 1986 now abandoned.

BACKGROUND OF THE INVENTION

The present invention relates to flat plate optical components including beam splitters, partial polarizers and polarization separators, and, in addition, to an optical system for optical disk readers which incorporates such flat plate components.

In magneto optics recording systems which are based upon the Faraday rotation effect, traces are produced on the magneto optics medium so that the Faraday rotation effect varies along the trace according to the signal that is recorded on the track. The present invention relates to a system for reading such traces which uses flat plate optical components.

FIG. 1 schematically depicts an optical system 10 for reading such traces. A linearly polarized laser beam 11 is focused to a small spot on the track of a target disk 12. Specifically, linearly polarized light beam 11 from a laser source 13 is collimated by lens 14 and then traverses beam splitter 16 to an objective lens 17 which focuses the resulting light beam 21 into a small spot 18 on the disk 12. Typically, reader system 10 will also include a conventional system (not shown) for scanning the beam 21 across the disk 12.

The incident beam 21 is reflected from the disk 12 back through the focusing lens 17. The reflected beam 22 is still linearly polarized, but the axis of polarization may have been shited slightly by any Faraday rotation effect of the magneto optics medium coated on the disk 12. The shift of the axis will be small, that is, in the order of 0.1° to 1°. The signal recorded on the track is detected by measuring this shift in the polarization axis of the reflected beam 22 as the focused spot is scanned along the trace. One way to sense the change of the axis is to use a polarization separator 24 to resolve the output beam 23 from the beam splitter 16 into two orthogonally linearly polarized component beams P and S, each polarized at 45° to the original axis of polarization.

Referring to FIG. 2, the intensity 28 and 29 of the two beams S and P will be exactly equal when there is no Faraday rotation (i.e., P=S). Referring also to FIG. 1, the resulting beams P and S can be directed by a collecting lens 26 to impinge on the electronic optical-intensity detectors of assembly 27. Conventionally, a circuit (not shown) is provided for electronically subtracting the signals from the two detectors of the detector assembly 27. In this case the circuit will provide essentially a zero output signal (P−S=0).

As indicated schematically in FIG. 3, rotation of the polarization axis through a small angle, $\alpha$, as the result of the Faraday rotation effect at disk 12, FIG. 1, will increase the intensity in one of the beams over that of the other (P>S). Subtraction of the output from the two detectors of the assembly 27 will then result in a positive signal, (P−S>0).

The effect of the rotation of the polarization axis can be enhanced by placing a partial polarizer in the returning beam 22 that favors the axis of polarization (S) that is perpendicular to the original axis (P).

Referring to FIG. 4, the division of the beam 22 into the two orthogonally polarized components can be done conventionally using a Wollaston prism 31 as the polarization separator 24 shown in FIG. 1. The Wollaston prism 31 consists of two pieces 32 and 33 of birefringent crystalline material such as calcite or quartz. The two pieces 32 and 33 are cemented together along surface 34 with their optical axes perpendicular. As a result, the assembled prism 31 will deflect the beams, P and S, of mutually perpendicular polarization at slightly different angles, so that they can be separated by lens 26 for detection.

Prisms, such as Wollaston prisms, have several advantageous characteristics when used as polarization separators. For example, the Wollaston prism provides a straight through beam path and does not require that the beam be collimated. In addition, prisms provide a very high separation ratio and the same path length for the P and S polarization. However, in volume commercial applications prisms have several overriding disadvantages. First, the desired prism materials such as calcite are expensive and scarce. Second, the prism components are difficult and costly to fabricate and assemble. In addition, passive surfaces such as 36 and 37 require an anti-reflection coating or matching to other optical elements. Such coatings are difficult and costly, particularly since the small prisms must be coated individually.

Prisms frequently are used as the beam splitter 16 and can be provided with a partial polarizer coating. However, as mentioned above, the materials used in prisms are expensive, the passive surfaces must be anti-reflection coated or matched to the next optical element(s), and the prisms are difficult and costly to fabricate, coat and assemble.

SUMMARY OF THE INVENTION

In view of the above discussion, it is one object of the present invention to provide an optical system of the type described above and depicted generically in FIG. 1, which uses relatively inexpensive, easily manufactured components for the beam splitter, partial polarizer and polarization separator.

In one aspect, the present invention relates to a flat plate beam splitter and partial polarizer for incident linearly polarized light, and comprises a flat, optically transparent plate having a first uncoated major surface and a second, opposite, major surface having a partial polarizing coating. When the flat plate and uncoated first surface are oriented at near Brewster's angle to a linearly polarized light beam, the plate reflects substantially none of one polarization component of the beam ($R_P \simeq 0$). Thus, polarization P traverses the plate. The optical coating on the second surface is designed to reflect substantially all of the second component, while substantially depleting the first component. (For example, $R_S \simeq 1$; $R_P \simeq 0.25$). As a result, none of the second component passes through the plate when the beam splitter/partial polarizer is interposed between a laser source and a Faraday rotation effect disk, and the angular deviation of the polarization axis of the returning beam which has undergone Faraday rotation is enhanced and the intensity and detector signal ratio are enhanced commensurately.

In still another aspect, the present invention relates to a flat plate polarization separator for separating an incident linearly polarized beam of light into separate P and S polarization , and comprises first and second optically transparent plates oriented at a small selected angle. Each flat plate has first and second substantially parallel surfaces. A full polarizer coating is formed on the first surface of the first plate so that when the plate and first surface thereof are oriented at Brewster's angle to the incident light, one polarization beam is substantially totally reflected ($R_S \simeq 1$) and the other is not reflected but passes freely through the first plate ($R_P \simeq 0$). The first surface of the second plate has a coating thereon which is highly reflective at the near-Brewster's angle of orientation of the second plate ($R_S \simeq 1$, $R \simeq 1$). Thus, as the combined result of the full polarizer coating on the first plate, the high reflector coating on the second plate and the angular orientation between the plates, the linearly polarized incident beam is deflected into its two constituent P and S orthogonally polarized component beams.

In still another aspect, my present invention relates to an optical reader system and includes means for producing a collimated monochromatic linearly polarized beam; a flat plate beam splitter and partial polarizer adapted for directing a selected component of the polarized beam to a target, separating the reflected beam from the beam incident onto the target, and selectively enhancing the relative intensity of the P and S polarization reflected from the target; a flat plate polarization separator for separating the linearly polarized reflective return beam into said selectively enhanced polarization; and means for providing separate images of said selectively enhanced P and S polarization.

BRIEF DESCRIPTION OF THE DRAWINGS

The above and other aspects of my present invention are disclosed in the accompanying drawings in which:

FIG. 8 depicts a slightly enlarged flat plate polarization separator of the type shown in FIG. 5; and FIG. 9 depicts an alternative wedge plate polarization separator.

DETAILED DESCRIPTION OF THE INVENTION

Overall Magneto Optical Reader System 40

Figure 1:
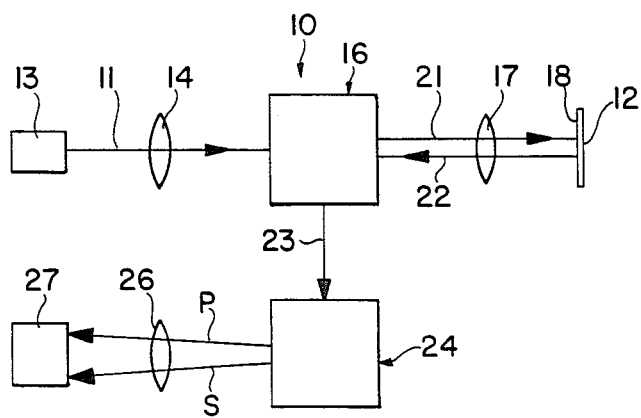
FIG. 1 is a schematic representation of an optical system for reading a magneto optic disk.
Figure 5:
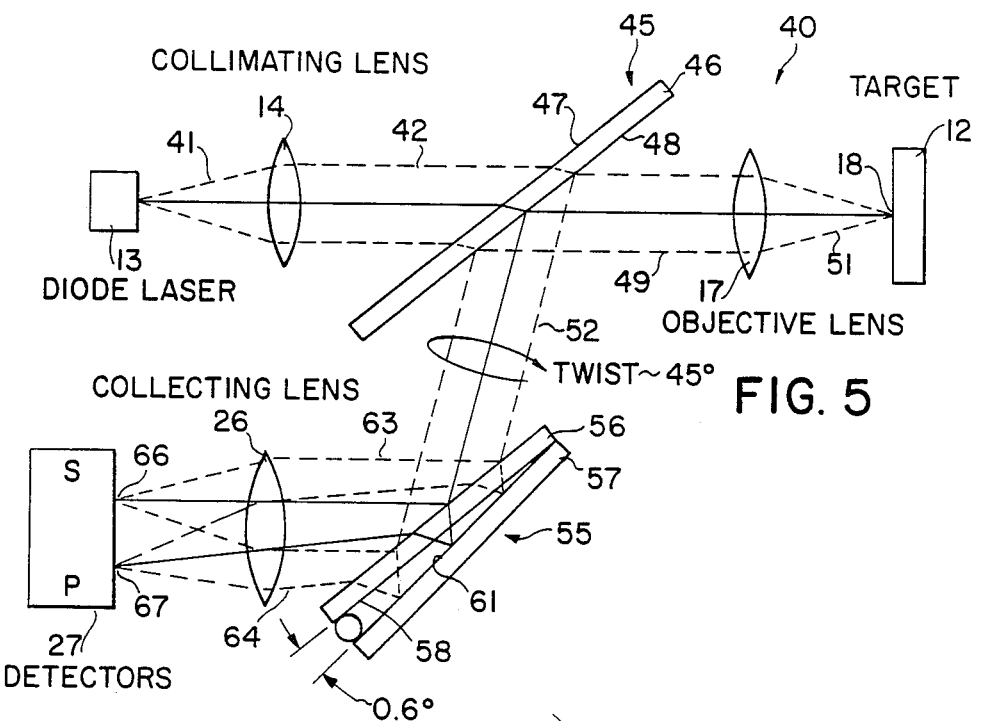
FIG. 5 is a schematic representation of an optical system for reading a magneto optic disk which incorporates a flat plate beam splitter/partial polarizer and a flat plate polarization separator.

FIG. 5 is a schematic representation, analogous to FIG. 1, of a preferred embodiment of a magneto optical reader system 40 which incorporates the flat plate, optically-coated components of my present invention. Source 13 typically is a conventional solid-state laser such as a gallium arsenide laser having a wavelength of $\simeq 830$ nm and is bascally a pinpoint monochromatic light source. The incident beam 41 from the point source 13 is collimated by lens 14 to provide collimated beam 42 to the flat plate component 45. Preferably, the flat plate component 45 is a partially polarizing beam splitter. It separates the returning beam 49R from target 12 from the outgoing beam 49I from the element 45.

The partial polarizer is used, as described below, to enhance the magneto optics effect.

Objective lens 17 focuses the outgoing beam 49I along path 51I to point 18 on the media disk or target 12. The objective lens 17 then recollimates the reflected beam 51R from the media disk or target 12 into beam 49R, which is deflected by the beam splitter action of flat plate element 45 onto path 52. The deflected returning beam 52 is directed at Brewster's angle onto the polarization separator 55 which, as discussed in detail below, resolves this beam 52 into two orthogonally polarized S and P component beams 63 and 64. The orientation may be arranged to make the components equal for a neutral media condition. Then, collector or re-imaging lens 26 forms separate images 66 and 67 of the P and S polarization on detector 27. The collector lens may have an astigmatic element as part of an autofocus system.

Preferably, the detector 27 is formed as a single chip, integrated circuit detector assembly, to decrease variations in the output of the detectors caused by drift. Also, as mentioned previously, the detector assembly 27 typically is connected to a conventional electronic circuit which electronically subtracts the signals derived from the intensity of the S and P polarization.

Partial Polarizer and Beam Splitter 45

To facilitate the identification of optical surfaces and their associated coatings, the reference numeral XX used for an optical surface (for example, 48) is used as the numeric prefix for its associated coating identification XXC (48C).

Preferably, the flat plate, combined beam splitter and partial polarizer component 45 comprises a thin plate 46 of optical quality glass such as BK7 having first and second substantially parallel major surfaces 47 and 48. Collimated beam 42 is incident upon the first surface 47, which is uncoated. As a result, when the plate and surface 47 are oriented at an angle of 56.5° to the incident beam 42, the reflectivity of the components of the linearly polarized beam 42 is $R_P \simeq 0$. That is, the P polarization is transmitted through the plate as beam 49I. The second surface 48 is given a partial polarizer coating 48C which is partially polarizing with respect to the return beam 49R from the target 12, so that the P polarization is depleted and the S polarization is fully reflected. (For example, $R_P \simeq 0.25$ and $R_S \simeq 1$). Thus, the partial polarizer coating 48C not only separates the returning beam from the incident beam path, but also partially polarizes the return beam.

If beam splitting alone were desired, i.e., if the partial polarization was not desired or necessary, a coating 48C would be used which is equally reflective for both the P and S polarization ($R_S \simeq 0.5$, $R_P \simeq 0.5$).

Effect of Partial Polarizer 45

As discussed above, the flat plate beam splitter/partial polarizer assembly 45 is formed of a flat plate 46 which has an uncoated first major surface 47 for transmitting P polarization. The opposite surface 48C is coated with a partial polarizer coating which depletes the original P polarization without substantially depleting the S polarization of the reflected beam.

Figure 2:
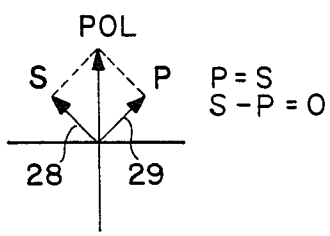
FIGS. 2 and 3 schematically depict the effect of rotation on the orthogonally polarized components of a reflected beam as a result of Faraday rotation.
Figure 6:
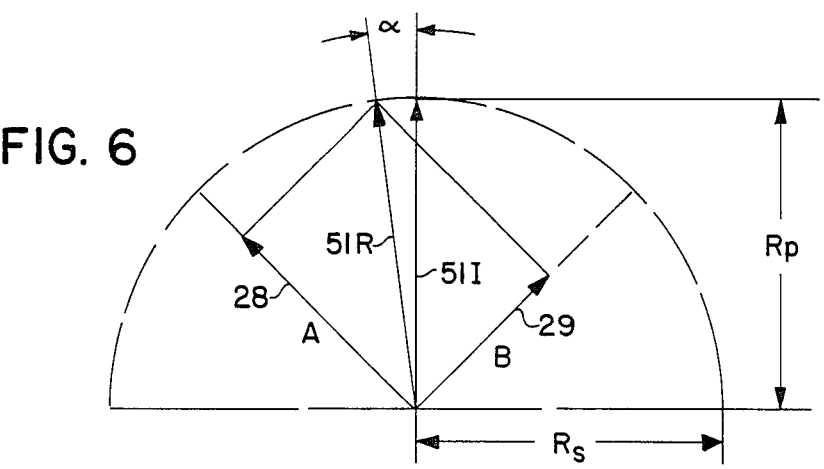
FIG. 6 depicts the intensity of polarization components as resolved by a polarization separator.

Referring now primarily to FIG. 6, the polarized beam 51I that is incident upon the target 12 has an intensity which is also denoted 51I. If the beam is not subjected to Faraday rotation at the target, the orientation of the polarization of the returning beam 51R is substantially the same. As a result, and as is shown also in FIG. 2, the P and S polarization intensities 28 and 29 are substantially equal when the beam is resolved into two orthogonally linearly polarized beams at 45° to the original orientation of polarization.

Figure 3:
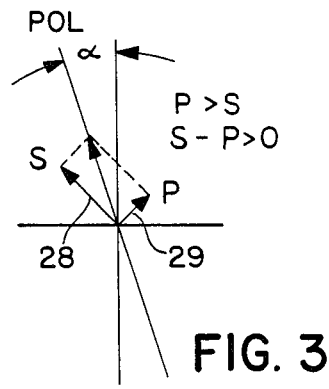
Figure 4:
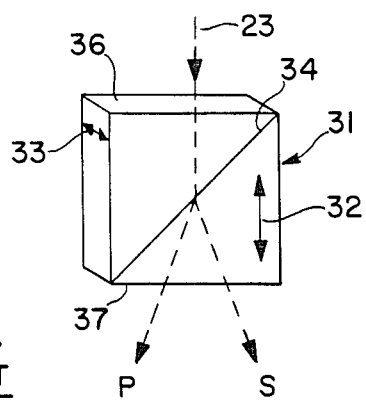
FIG. 4 depicts the structure and optical function of a Wollaston prism.

If, instead, the transmitted beam 51I experiences Faraday rotation at the target 12, its polarization is shifted through a small angle, $\alpha$. The angle $\alpha$ is shown greatly exaggerated for clarity. The actual angle of polarization shift is in the order of 0.1°–1°. As a result, and as is shown also in FIG. 3, the S intensity 28 is larger than the P intensity 29 by a factor of 1.3. That is, the intensity ratio A/B is approximately 1.30.

Figure 7:
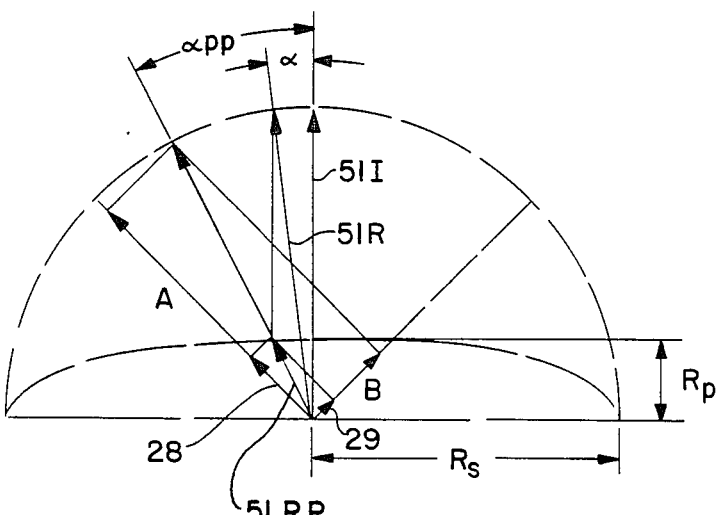
FIG. 7 depicts the intensity of polarization components as resolved by a polarization separator after reflection off a partial polarizer.

FIG. 7 is a schematic diagram of the intensity of the S and P polarizations which illustrates the effect of the partial polarizer coating 48C (FIG. 5). Illustratively, the optical qualities of the coating 48C have been selected so that $R_S \simeq 4\, R_P$. The returning beam 51R still has its polarization rotated by the angle $\alpha$. Because the reflectance for the P component is much less than that for the S component, the amplitude of the resulting effective polarization 51RP is smaller than before (smaller than that for 51R after reflection of the partial polarizer). However, the angle of deviation, $\alpha$ of its axis of polarization, is much greater. The increase in $\alpha$ increases the ratio A/B of the S and P polarization intensity, from about 1.3 (FIG. 6) to about 3.1 when the beam is resolved into two orthogonally polarized components at 45° to the original axis of polarization. This enhanced ratio of the polarization intensities provided by partial polarization increases the detection sensitivity of the system, because the intensity ratio A/B is effectively the detector signal ratio associated with the S and P detectors 66 and 67 (FIG. 5). In short, the energy or amplitude of the S and P polarization is decreased, but the angular deviation and detection sensitivity is substantially increased.

The above-described, optically-coated flat plate partially polarizing beam splitter has the advantage, relative to prism partial polarizing beam splitters, of not requiring coating of passive surfaces or matching to the next optical element. In addition, the flat plate component is inexpensive to fabricate and coat. For example, the flat plate can be formed and coated in large sheets, then cut into a large number of individual flat plate components 45. Successful use of this flat plate solution requires a partial polarizing coating, described below, which is stable over a long period of time and unaffected by moisture and temperature variations.

Polarization Separator 55

Referring to FIG. 8, the flat plate polarization separator 55 is formed of first aid second flat plates 56 and 57. These plates are joined directly together at one end and are joined at the opposite end to a rod or wire 68, to provide an angular orientation of, for example, 0.6°.

Consider now the plate surfaces encountered by an incident beam of light. The first surface 58 of the first plate 56 contains a full polarizer coating 58C ($R_P \simeq 0$, $R_S \simeq 1$) so that the S polarization is substantially reflected and the P polarization traverses the plae. The second surface 59 of the first plate is uncoated ($R_P \simeq 0$) so that there is substantially no reflectance and the P polarization is directed onto the first surface 61 of the second plate 57.

The surface 61 has a high reflector coating 61C formed thereon ($R_P \simeq 1$, $R_S \simeq 1$) so that the P polarization is reflected from the plate 57 back through the first plate 56, at an angle relative to the S polarization which is approximately double the, angular separation between the two plates. Illustratively, the S and P divergence is about 1.2°. Then, as discussed relative to FIG. 5, the re-imaging or collector lens 26 forms separate images of the S and P polarization at the focal points 66 and 67 on the detector assembly 27.

Like the flat plate beam splitter/partial polarizer component 45, the flat plate polarization separator 55 has the potential advantage of being inexpensive to fabricate, coat and assemble and of not requiring AR coatings or matching at the passive surfaces. Again, successful use of the flat plate solution requires special optical qualities in the associated coatings (in this case, full polarization in coating 58C and high reflection in coating 61C), in addition to stability.

Coatings

1. Full Polarizer Coating 58C

In a presently preferred embodiment, the full polarization coating 58C and the high reflection coating 61C comprise alternating thin layers of materials having high and low indices of refraction and the required stability. Thus, these coatings permit the successful construction and use of the flat plate partially polarizing beam splitter. One suitable high index material is titanium dioxide ($TiO_2$), which has an index of refraction, n, of 2.35. One suitable low index material is silicon dioxide ($SiO_2$), with $n = 1.45$.

For example, the full polarizer coating 58C with the reflectivities of $R_P \simeq 0$, $R_S \simeq 1.0$ at 56.5° incidence can comprise the following composite layers: glass, 0.43H (0.97L, 0.86H)$^3$, (1.03L, 0.91H)$^7$, (0.97L, 0.86H)$^2$, 0.97L, 0.43H, air. In this exemplary design, twenty-seven thin layers are formed on the glass surface 58 by vacuum deposition process. In the notation used, the superscripts such as 3, 7 and 2 indicate that the layer sequence within the associated parentheses is repeated, respectively, three times, seven times and twice. The letters L and H stand for a quarter wavelength equivalent thickness of the high and low index material, respectively, at the working wavelength. Thus, the identification of each layer, such as 0.43H or 0.97L, indicates whether it is a high (H) or low (L) index of refraction material and also the thickness relative to a quarter wave equivalent thickness.

For example, layer 0.43H is the relatively high index of refraction material titanium dioxide ($TiO^2$) for which $n = 2.35$. For the exemplary working wavelength of 830 nm, $H = (830\ nm/2.35)(\frac{1}{4}) \simeq 88.29$ nm. Thus, the thickness of layer $0.43H \simeq 0.43\ (88.29) \simeq 38$ nm. In short, the layer adjacent the glass is the high index material titanium dioxide formed to a thickness of approximately 38 nanometers.

To further illustrate the notation used, the second layer from the glass, 0.97L, comprises the relatively low index material silicon dioxide of thickness 139 nm $(0.97L = 0.97(830/1.45)(\frac{1}{4}) \simeq 138.8)$.

The third layer is the relatively high index material titanium dioxide ($TiO_2$) of thickness 76 nm $(0.86H = 0.86(830/2.35)(\frac{1}{4}) \simeq 75.9)$. Of course, the thicknesses of the other layers are computed in the same way.

2. High Reflector Coating 61C

The high reflector surface coating 61C with the reflectivities $R_P \simeq 1.0$ and $R_S \simeq 1.0$ at 56.5° incidence can have the following exemplary design: glass, $(1.07H,1.21L)^{10}$, air.

3. Partially Polarizing Beam Splitter Coating 48C

Using the above-described nomenclature, the partial polarizer surface 48C having exemplary reflectivities $R_P \approx 0.25$ and $R_S \approx 1.0$ at 56.5° incidence can have this design: glass, 0.96H, 1.67L, 1.51H, 1.46L, 1.05H, 1.05L, 0.80H, 0.80L, 0.72H, 0.91L, 0.90H, air. Again, the composite coating of alternating thin layers of material (illustratively eleven layers) of high and low index of refraction and the use of such material having the required stability permit the successful construction and use of a flat plate partially polarizing beam splitter component which provides the above-described advantages.

It should be emphasized that the above-described designs of the coatings are given by way of example and that coatings of different designs with different materials will produce the same or similar results. One of usual skill in the art will readily devise these and other equivalent multi-layer composite optical coatings based upon the desired reflectivities and using standard algorithms for optimizing the composite coatings.

FIG. 9 discloses an alternative, wedge plate polarization separator 75. The wedge plate embodiment comprises a wedge-shaped optically transparent glass body 76 having opposite major surfaces 78 and 81 which are oriented at the desired small angle. Front surface 78 receives a full polarizer coating 78C which is the same as coating 58C described above. Rear surface 81 receives a high reflector coating 81C which is the same as coating 61C described above. The wedge plate polarization separator 75 has the advantages relative to a prism polarization separator of not requiring coating or matching of passive surfaces, of requiring no assembly, and of being less costly to fabricate. The wedge plate polarization separator is more expensive to fabricate and coat than the flat plate separator 55 (the wedge shaped glass body 71 must be coated individually).

In short, the desired special optical characteristics and stability provided by the above-described partial polarizing, full polarizing and high reflectivity coatings permit the above-described, flat plate beam splitter/partial polarizer 45 and flat plate polarization separator 55 solutions which are preferred over prism components.

Having thus described the preferred and alternative embodiments of the present invention, what is claimed is:

1. An optical reader system, comprising:
means for producing a collimated linearly polarized light beam;
a beam splitter and partial polarizer plate comprising a flat, optically transparent glass plate having first and second opposite major surfaces, the first surface being uncoated for transmitting a selected one of two orthogonal polarization components and said second surface having a partial polarizer coating for reflecting said second component substantially without depletion and for reflecting said first component with selected depletion, for directing said selected one of two orthogonal polarization components of the polarized beam to a target and reflectively separating the resulting reflected beam from the beam directed to the target, and selectively enhancing the relative intensity of said two orthgonal polarization components reflected from the target;
a plate polarization separator assembly comprising first and second flat plates oriented at selected angles, each of the first and second plates having first and second opposite major surfaces along the direction of the incident linearly polarized reflected beam, said first surface of the first plate having a full polarizer coating for reflecting said second polarization component and transmitting said first polarization component therethrough, said plate being oriented at Brewster's angle relative to the linearly polarized reflected beam, and said first surface of the second plate having a high reflector coating for reflecting the first polarization component back through the first plate, to thereby provide separated divergent beams of said first and second polarization components, for separating the linearly polarized reflected beam into said selectively enhanced polarization components; and
means for determining the relative intensities of said selectively enhanced polarization components.

2. The optical reader system of claim 1, said partially polarizing coating comprising a composite of thin layers, each layer comprising a material selected from materials having relatively high and low indices of refraction, for reflecting said second component substantially without depletion and reflecting said first component with said selected depletion.

3. The optical reader system of claim 2, said relatively high index material being titanium dioxide and said relatively low index material being silicon dioxide.

4. The optical reader system of claim 3, said partially polarizing coating having eleven layers comprising, in order, from said second glass surface, 0.96H, 1.67L, 1.51H, 1.46L, 1.05H, 1.05L, 0.80H, 0.80L, 0.72H, 0.91L, 0.90H, for providing a reflectivity of about 1 for said second polarization component and a reflectivity of about 0.25 for said first polarization component at an angle of incidence of about 56.5°; and wherein L and H are quarter wavelength equivalent thicknesses of silicon dioxide and titanium dioxide, respectively, for a selected wavelength of the linearly polarized light beam.

5. The optical reader system of claim 1, said full polarizer coating comprising a composite of thin layers, each layer comprising a material selected from materials having relatively high and low indices of refraction, for reflecting said second polarization component and transmitting said first component therethrough.

6. The optical reader system of claim 5, said relatively high index material being titanium dioxide and said relatively low index material being silicon dioxide.

7. The optical reader system of claim 6, said full polarizer coating having twenty-five layers comprising in order from said first surface of the first plate: 0.43H; a sequence of three repeated double layers, each double layer comprising (0.97L, 0.86H); a sequence of seven repeated double layers, each double layer comprising (1.03L, 0.91H); a sequence of two repeated double layers, each double layer comprising (0.97L, 0.86H); 0.97L; 0.43H, for providing a refectivity of about 1 for said second polarization component and a reflectivity of about 0 for said first polarization component; and wherein L and H are quarter wavelength equivalent thicknesses of silicon dioxide and titanium dioxide, respectively, for a selected wavelength of the linearly polarized light beam.

8. The optical reader system of claim 1, said high reflector coating comprising a composite of thin layers, each layer comprising a material selected from materials having relatively high and low indices of refraction, for reflecting said first polarization component.

9. The optical reader system of claim 8, said relatively high index material being titanium dioxide and said relatively low index material being silicon dioxide.

10. The optical reader system of claim 9, said high reflector coating comprising a sequence of ten repeated double layers, each double layer comprising in order from said first surface of the second plate (1.07H, 1.21L) for providing a reflectivity of about 1 for said first and second polarization components at an angle of incidence of about 56.5°; and wherein L and H are quarter wavelength equivalent thicknesses of silicon dioxide and titanium dioxide, respectively, for a selected wavelength of the linearly polarized light beam.

* * * * *